United States Patent
Sun et al.

(10) Patent No.: US 10,766,988 B2
(45) Date of Patent: Sep. 8, 2020

(54) ETHYLENE/ALPHA-OLEFIN COPOLYMER HAVING EXCELLENT PROCESSIBILITY

(71) Applicant: LG Chem, Ltd., Seoul (KR)

(72) Inventors: Soon Ho Sun, Daejeon (KR); Yi Young Choi, Daejeon (KR); Ki Soo Lee, Daejeon (KR); Bog Ki Hong, Daejeon (KR); Sung Hyun Park, Daejeon (KR); Myung Han Lee, Daejeon (KR); Sung Min Lee, Daejeon (KR); Sun Mi Kim, Daejeon (KR); Jin Young Park, Daejeon (KR)

(73) Assignee: LG Chem, Ltd. (KR)

( * ) Notice: Subject to any disclaimer, the term of this patent is extended or adjusted under 35 U.S.C. 154(b) by 64 days.

(21) Appl. No.: 16/094,722

(22) PCT Filed: Nov. 2, 2017

(86) PCT No.: PCT/KR2017/012342
§ 371 (c)(1),
(2) Date: Oct. 18, 2018

(87) PCT Pub. No.: WO2018/093079
PCT Pub. Date: May 24, 2018

(65) Prior Publication Data
US 2019/0119421 A1    Apr. 25, 2019

(30) Foreign Application Priority Data

Nov. 15, 2016 (KR) ........................ 10-2016-0152220

(51) Int. Cl.
| | | |
|---|---|---|
| *C08F 210/16* | (2006.01) | |
| *C08F 4/6592* | (2006.01) | |
| *C08F 4/659* | (2006.01) | |

(52) U.S. Cl.
CPC ........ *C08F 210/16* (2013.01); *C08F 4/65908* (2013.01); *C08F 4/65912* (2013.01); *C08F 4/65916* (2013.01)

(58) Field of Classification Search
CPC .............. C08L 23/0815; C08F 4/65904; C08F 4/65925; C08F 4/65927; C08F 210/16
See application file for complete search history.

(56) References Cited

U.S. PATENT DOCUMENTS

| | | |
|---|---|---|
| 4,935,474 A | 6/1990 | Ewen et al. |
| 5,914,289 A | 6/1999 | Razavi |
| 6,828,394 B2 | 12/2004 | Vaughan et al. |
| 6,841,631 B2 | 1/2005 | Loveday et al. |
| 6,894,128 B2 | 5/2005 | Loveday et al. |
| 2010/0179291 A1 | 7/2010 | Lee et al. |
| 2011/0217499 A1 | 9/2011 | Mannebach et al. |
| 2013/0317186 A1 | 11/2013 | Lee et al. |
| 2013/0317187 A1 | 11/2013 | Lee et al. |
| 2016/0083488 A1 | 3/2016 | Buryak et al. |
| 2016/0280822 A1 | 9/2016 | Kim et al. |
| 2017/0233511 A1 | 8/2017 | Sun et al. |

FOREIGN PATENT DOCUMENTS

| | | |
|---|---|---|
| AU | 2003251207 A1 | 9/2004 |
| CA | 2274062 A1 | 8/1998 |
| KR | 20000070672 A | 11/2000 |
| KR | 20010048553 A | 6/2001 |
| KR | 20040076965 A | 9/2004 |
| KR | 101114964 B1 | 2/2012 |
| KR | 20140009397 A | 1/2014 |
| KR | 101603407 B1 | 3/2016 |
| KR | 20160043516 A | 4/2016 |
| KR | 20160054844 A | 5/2016 |
| KR | 20160123123 A | 10/2016 |
| KR | 20160123172 A | 10/2016 |
| KR | 20180040998 A | 4/2018 |
| WO | 1998034986 A1 | 8/1998 |
| WO | 2004076502 A1 | 9/2004 |
| WO | 2012134700 A2 | 10/2012 |

OTHER PUBLICATIONS

Extended European Search Report including Written Opinion for Application No. EP17872380.5 dated May 27, 2019, pp. 1-10.
Fraser, et al., "Polyethylene Product Capabilities From Metallocene Catalysts with the UNIPOL Process", Univation Technologies, 1997, pp. 1-16.
International Search Report for PCT/KR2017/012342, dated Feb. 12, 2018.
Stadler, et al., "Thermorheological Behavior of Various Long-Chain Branched Polyethylenes", Macromolecules, vol. 41, No. 4, Feb. 2008, pp. 1328-1333.

*Primary Examiner* — Caixia Lu
(74) *Attorney, Agent, or Firm* — Lerner, David, Littenberg, Krumholz & Mentlik, LLP

(57) ABSTRACT

The present disclosure relates to an ethylene/alpha-olefin copolymer having excellent processibility. The ethylene/alpha-olefin copolymer according to the present disclosure is excellent in both mechanical properties and processibility.

7 Claims, 1 Drawing Sheet

ETHYLENE/ALPHA-OLEFIN COPOLYMER HAVING EXCELLENT PROCESSIBILITY

CROSS-REFERENCE TO RELATED APPLICATIONS

The present application is a national phase entry under 35 U.S.C. § 371 of International Application No. PCT/KR2017/012342 filed Nov. 2, 2017, which claims priority from Korean Patent Application No. 10-2016-0152220 filed Nov. 15, 2016, all of which are incorporated herein by reference.

TECHNICAL FIELD

The present disclosure relates to an ethylene/alpha-olefin copolymer having excellent processibility.

BACKGROUND OF ART

Olefin polymerization catalyst systems may be divided into Ziegler-Natta and metallocene catalysts, and these highly active catalyst systems have been developed in accordance with their characteristics. Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties.

Meanwhile, the metallocene catalyst includes a main catalyst having a transition metal compound as a main component and an organometallic compound cocatalyst having aluminum as a main component. Such a catalyst is a single-site catalyst which is a homogeneous complex catalyst, and offers a polymer having a narrow molecular weight distribution and a uniform compositional distribution of comonomers, due to the single site characteristics. The stereoregularity, copolymerization characteristics, molecular weight, crystallinity, etc. of the resulting polymer may be controlled by changing a ligand structure of the catalyst and polymerization conditions.

U.S. Pat. No. 5,914,289 discloses a method for controlling a molecular weight and a molecular weight distribution of polymers using metallocene catalysts which are respectively supported on supports. However, a large amount of solvent and a long period of time are required to prepare the supported catalysts, and a process of supporting metallocene catalysts on the respective supports is troublesome.

Korean Patent Application No. 2003-12308 discloses a method for controlling molecular weight distributions of polymers, in which the polymerization is performed while changing a combination of catalysts in a reactor by supporting a dinuclear metallocene catalyst and a mononuclear metallocene catalyst on a support together with an activating agent. However, this method has limitations in simultaneously realizing the characteristics of respective catalysts. In addition, there is a disadvantage that the metallocene catalysts are departed from a supported component of the resulting catalyst to cause fouling in the reactor.

Therefore, to solve the above drawbacks, there is a continuous demand for a method for preparing polyolefins with desired physical properties by easily preparing a supported metallocene catalyst having an excellent activity.

Meanwhile, a linear low density polyethylene (LLDPE) is produced by copolymerizing ethylene and an alpha olefin using a polymerization catalyst under low pressure. Thus, this is a resin having a narrow molecular weight distribution and a certain length of a short chain branch (SCB), without long chain branch (LCB). LLDPE film has high strength at break and elongation in addition to the properties of a general polyethylene and exhibits excellent tear strength, falling weight impact strength or the like. This has led to an increase in the use of a stretch film, an overlapping film or the like which is difficult to apply existing low density polyethylene or high density polyethylene.

A process of preparing linear low density polyethylene using 1-butene or 1-hexene as a comonomer is generally performed in a single gas phase reactor or a single loop slurry reactor, and its productivity is higher than a process using 1-octene comonomers. However, due to limitations of catalyst and process technologies, the product has physical properties inferior to those of a product obtained by using 1-octene comonomers, and has a narrow molecular weight distribution to show poor processability. Many efforts have been made to improve these problems.

U.S. Pat. No. 4,935,474 discloses a method of preparing polyethylene with a broad molecular weight distribution by using two or more metallocene compounds. U.S. Pat. No. 6,828,394 discloses a method of preparing polyethylene having excellent processability, in particular, being suitable for films by using a mixture of a good comonomer incorporator and a poor comonomer incorporator. In addition, U.S. Pat. Nos. 6,841,631 and 6,894,128 disclose that polyethylene having a bimodal or multimodal molecular weight distribution is prepared by using a metallocene catalyst containing at least two metal compounds, thereby being applied to films, blow molded products, pipes, and the like. However, even though these products have improved processability, the dispersion state according to the molecular weight in a unit particle is not uniform, and thus appearance is rough and physical properties are not stable under relatively mild extrusion conditions.

Under this background, there is a continuous demand for preparation of an excellent product in which a balance between physical properties and processability is ensured, and especially a polyethylene copolymer having excellent processability is further required.

DETAILED DESCRIPTION OF THE INVENTION

Technical Problem

In order to solve problems of the prior art, the present disclosure provides an ethylene/alpha-olefin copolymer having not only excellent processibility but also excellent mechanical properties.

Technical Solution

In order to solve the above problems, the present disclosure provides an ethylene/alpha-olefin copolymer having:

a weight average molecular weight of 50,000 to 250,000 g/mol, a molecular weight distribution (Mw/Mn) of 5 to 20, a density of 0.950 to 0.965 g/cm3, a melt flow rate ratio ($MFR_5/MFR_{2.16}$, measured at 190° C. according to ASTM 1238) of 3 to 10, and a spiral flow length of 15 to 25 cm.

In general, a polymer prepared by a metallocene catalyst has trade-off between processability and mechanical properties depending on a weight average molecular weight. That is, when the weight average molecular weight is increased, the mechanical properties are improved but the processability is decreased. On the contrary, when the weight average molecular weight is decreased, the processability is improved but the mechanical properties are decreased.

Accordingly, the present disclosure is characterized in that it can improve the mechanical properties and processability simultaneously by introducing Long Chain Branch (LCB) into the ethylene/alpha-copolymer using a metallocene catalyst which will be described below.

The weight average molecular weight of the ethylene/alpha-olefin copolymer according to the present disclosure is 50,000 to 250,000 g/mol. Preferably, the weight average molecular weight is 100,000 or more, 110,000 or more, 120,000 or more, 130,000 or more, 140,000 or more, 150,000 or more, 160,000 or more, 170,000 or more, or 180,000 or more. In addition, the weight average molecular weight is preferably 240,000 or less, 230,000 or less, or 220,000 or less.

The molecular weight distribution (Mw/Mn) of the ethylene/alpha-olefin copolymer according to the present disclosure is 5 to 20. Preferably, the molecular weight distribution is 6 or more, 7 or more, 8 or more, 9 or more, or 10 or more. In addition, the molecular weight distribution is preferably 19 or less, 18 or less, 17 or less, 16 or less, or 15 or less.

The melt flow rate ratio ($MFR_5/MFR_{2.16}$, measured at 190° C. according to ASTM 1238) of the ethylene/alpha-olefin copolymer according to the present disclosure is 3 to 10. Preferably, the melt flow rate ratio is 4 or more, or 5 or more. In addition, the melt flow rate ratio is preferably 9 or less, or 8 or less.

In addition, a $C_2$ value of Equation 1 is −1.0 to −0.4, when a graph of complex viscosity ($\eta^*[Pa \cdot s]$) versus frequency ($\omega[rad/s]$) of the ethylene/alpha-olefin copolymer according to the present disclosure is fitted to Power Law of the following Equation 1.

$$y = c_1 x^{c_2} \qquad \text{[Equation 1]}$$

For a perfectly elastic material, a deformation occurs in proportion to an elastic shear stress, which is called a Hook's law. In addition, for a pure viscose liquid, a deformation occurs in proportion to a viscous shear stress, which is called a Newton's law. For a completely elastic material, a deformation can be again restored when the elastic energy is accumulated and the elastic shear stress is removed. However, for a completely viscous material, the energy is completely discarded by deformation and thus the deformation is not restored even when the elastic shear stress is removed. In addition, the viscosity of the material itself does not change.

However, in a molten state, a polymer has an intermediate property between a completely elastic material and a viscous liquid, which is called a viscoelasticity. In other words, when a polymer is subjected to a shear stress in the molten state, the deformation is not proportional to the shear stress, and its viscosity varies depending on the shear stress, which is called a non-Newtonian fluid. These properties are due to the complexity of deformation due to the shear stress because the polymer has a huge molecular size and a complex intermolecular structure.

In particular, when producing a molded article by using a polymer, a shear-thinning phenomenon is considered as one of the important characteristics of the non-Newtonian fluid. The shear-thinning phenomenon means a phenomenon in which the viscosity of a polymer decreases as the shear rate increases. The method of molding a polymer is determined according to these shear-thinning properties.

Therefore, the present disclosure measures the shear-thinning property by a graph of complex viscosity ($\eta^*[Pa \cdot s]$) versus frequency ($\omega[rad/s]$).

The Equation 1 is a model for quantitatively evaluating the shear-thinning property of ethylene/alpha-olefin copolymer according to the present disclosure, and also is a model for estimating the complex viscosity at high frequency by applying data of complex viscosity versus frequency.

The Equation 1 is a Power Law model in which x means frequency and y means complex viscosity, and two variables of $C_1$ and $C_2$ are required. $C_1$ refers to a consistency index, $C_2$ refers to a CV index, and a $C_2$ value is a gradient of the graph. The higher the complex viscosity at low frequency, the better the physical properties. Also, the lower the complex viscosity at high frequency, the better the processability. Therefore, the smaller the $C_2$ value, that is, the larger the negative gradient of the graph, it is better.

The complex viscosity versus frequency can be obtained by a dynamic frequency sweep at 190° C. using an advanced rheometric expansion system (ARES). The dynamic frequency sweep can be measured using a disc-shaped 25 mm parallel plate. In addition, for fitting a graph of complex viscosity versus frequency to the Equation 1 above, TA Orchestrator which is a ARES measurement program of TA Instruments can be used.

In addition, a plateau delta value in a Van Gurp Palmen plot of the ethylene/alpha-olefin copolymer according to the present disclosure is 0.1 to 1.0 rad.

In the Van Gurp-Palmen plot, the x-axis represents complex modulus (G, dyne/$cm^2$) and the y-axis represents phase angle (d(delta)). This plot is used to determine the presence of LCB in an olefin-based polymer. In particular, if an inflection point exists in the plot, it means that LCB exists in the polymer. This polymer with LCB exhibits excellent swell, bubble stability, melt fracture, sagging time, and the like, thereby being applied to various fields according to the intended use.

The Van Gurp-Palmen plot can be obtained by plotting G* and delta among variables derived from dynamic frequency sweep test. G* is a force applied to deform the polymer, and delta is an elastic term.

In addition, the ethylene/alpha-olefin copolymer may be an ethylene homopolymer, or may include a comonomer other than ethylene. The content of the comonomer is preferably 0.5 to 5 wt % based on the metallocene polypropylene. As the comonomer, a C3 to C10 alpha-olefin other than ethylene may be used. For example, at least one selected from the group consisting of 1-propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene, and mixtures thereof may be used. Preferably, 1-butene is used as the comonomer.

The ethylene/alpha-olefin copolymer may be prepared by polymerizing ethylene and alpha-olefin in the presence of a supported single metallocene catalyst including a metallocene compound of the following Chemical Formula 1; a first cocatalyst; a borate-based second cocatalyst; and a support:

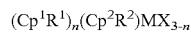  [Chemical Formula 1]

in Chemical Formula 1,

M is a Group 4 transition metal;

$Cp^1$ and $Cp^2$ are same as or different from each other, and are each independently any one selected from the group consisting of cyclopentadienyl, indenyl, 4,5,6,7-tetrahydro-1-indenyl, and fluorenyl radical, provided that both $Cp^1$ and Cp² are not cyclopentadienyl, and they may be substituted with a C1 to C20 hydrocarbon;

R¹ and R² are same as or different from each other, and are each independently hydrogen, a C1 to C20 alkyl, a C1 to C10 alkoxy, a C2 to C20 alkoxyalkyl, a C6 to C20 aryl, a C6 to C10 aryloxy, a C2 to C20 alkenyl, a C7 to C40 alkylaryl, a C7 to C40 arylalkyl, a C8 to C40 arylalkenyl, or a C2 to C10 alkynyl;

X is a halogen atom, a C1 to C20 alkyl, a C2 to C10 alkenyl, a C7 to C40 alkylaryl, a C7 to C40 arylalkyl, a C6 to C20 aryl, a substituted or unsubstituted C1 to C20 alkylidene, a substituted or unsubstituted amino, a C2 to C20 alkylalkoxy, or a C7 to C40 arylalkoxy; and n is 1 or 0.

A method for preparing the supported single metallocene catalyst includes a method that the metallocene compound of Chemical Formula 1 is supported before or after supporting the first cocatalyst (for example, an aluminum-containing organometallic compound).

In the supported single metallocene catalyst, a molar ratio of metal contained in the metallocene compound:boron contained in the second cocatalyst may be about 1:0.5 to about 1:3, about 1:0.8 to about 1:2, or about 1:0.9 to about 1:1.5. If the molar ratio is less than 1:0.5, catalytic activity is decreased. If the molar ratio is more than 1:3, the activity is excellent, but polymerization reactivity is uneven and process operation is not easy.

In the supported single metallocene catalyst, examples of the specific substituent of the Chemical Formula 1 are as follows.

The C1 to C20 alkyl includes a linear or branched alkyl and specific examples thereof include methyl, ethyl, propyl, isopropyl, n-butyl, tert-butyl, pentyl, hexyl, heptyl, octyl and the like.

The C2 to C20 alkenyl includes a linear or branched alkenyl, and specific examples thereof include allyl, ethenyl, propenyl, butenyl, pentenyl and the like.

The C6 to C20 aryl includes a single ring or condensed ring-type aryl, and specific examples thereof include phenyl, biphenyl, naphthyl, phenanthrenyl, fluorenyl and the like.

The C1 to C10 alkoxy includes methoxy, ethoxy, phenyloxy, hexyloxy, and the like.

The C2 to C20 alkoxyalkyl includes methoxymethyl, tert-butoxymethyl, tert-butoxyhexyl, 1-ethoxyethyl, 1-methyl-1-methoxyethyl and the like.

The Group 4 transition metal includes titanium, zirconium, hafnium, and the like.

The metallocene compound represented by Chemical Formula 1 may be a compound represented by any one of the following structural formulae, but is not limited thereto.

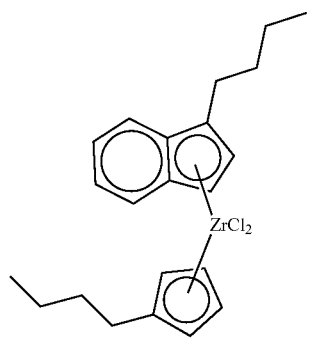

-continued

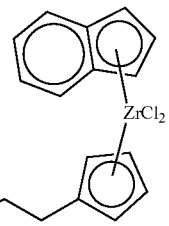

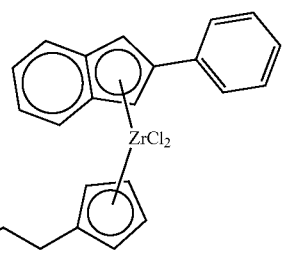

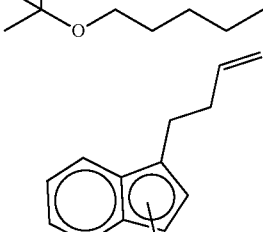

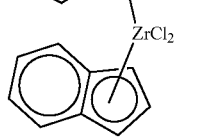

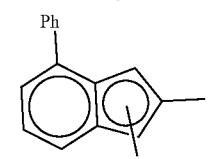

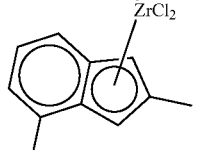

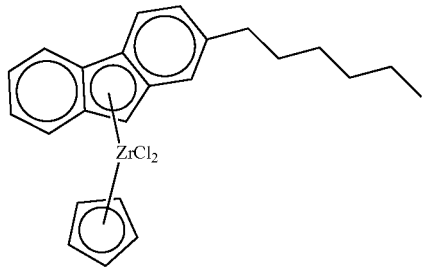

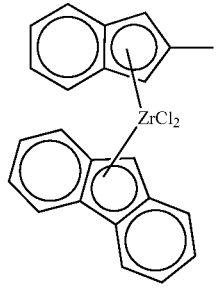

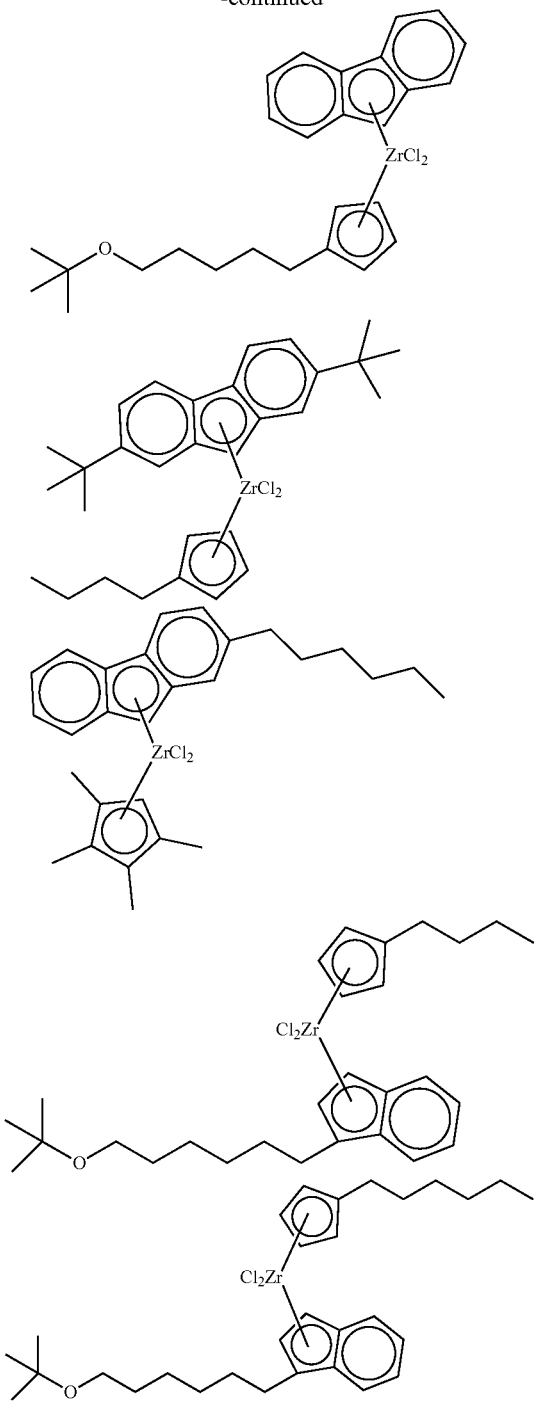

In the supported single metallocene catalyst, the support for supporting the metallocene compound may contain a hydroxy group on its surface. An amount of hydroxy groups (—OH) on the surface of the support is preferably as small as possible, but it is practically difficult to eliminate all hydroxy groups. The amount of hydroxy groups may be controlled by the preparation method, the preparation conditions, the drying conditions (temperature, time, drying method, etc.), etc. of the support. For example, the amount is preferably 0.1 to 10 mmol/g, and more preferably 0.5 to 1 mmol/g. If the amount of hydroxyl group is less than 0.1 mmol/g, reactive sites with cocatalyst are reduced. If the amount of hydroxyl group is more than 10 mmol/g, it is not desirable because it may be caused by moisture besides the hydroxyl groups present on the surface of support particles.

Herein, in order to reduce side reactions caused by some hydroxy groups remaining after drying, it is also possible to use a support in which the hydroxy groups are chemically removed while preserving siloxane groups having high reactivity which participate in the supporting.

In this case, the support may preferably have both the highly reactive hydroxyl group and siloxane group on the surface. For example, silica, silica-alumina, or silica-magnesia, which is dried at high temperature, can be used, and it may usually contain oxides, carbonates, sulfates, or nitrates such as $Na_2O$, $K_2CO_3$, $BaSO_4$, $Mg(NO_3)_2$ and the like.

It is preferable that the support is used in a sufficiently dried state before the first and second cocatalysts and the like are supported. The support is preferably dried at 200 to 800° C., more preferably at 300 to 600° C., and most preferably at 400 to 600° C. If the drying temperature of the support is lower than 200° C., it contains too much moisture so that moisture on the surface reacts with the cocatalyst. If the drying temperature is higher than 800° C., pores on the surface of the support are combined with each other to reduce surface area, and many hydroxyl groups are lost on the surface, leaving only siloxane groups. Thus, the reactive sites with cocatalyst are reduced, which is not preferable.

Meanwhile, the single metallocene catalyst may include a first cocatalyst and a second cocatalyst for generating active species of the catalyst. The use of the two cocatalysts can improve catalytic activity and, in particular, the use of the second cocatalyst can control molecular weight distribution of the polyolefin.

As the first cocatalyst, any cocatalyst can be used as long as it is used for polymerizing an olefin in the presence of a general metallocene catalyst. This first cocatalyst causes a bond to be formed between the hydroxy group of the support and the Group 13 transition metal. In addition, the first cocatalyst can be present only on the surface of the support, thereby contributing to securing intrinsic properties of the present supported single metallocene catalyst without a fouling phenomenon that polymer particles are entangled to the wall surface of the reactor or with each other.

In the supported single metallocene catalyst, the first cocatalyst may be at least one selected from compounds represented by the following Chemical Formulae 2 and 3:

$$—[Al(R^3)—O]_a— \qquad \text{[Chemical Formula 2]}$$

$$D(R^4)_3 \qquad \text{[Chemical Formula 3]}$$

in Chemical Formulae 2 and 3, $R^3$ are same as or different from each other, and are each independently halogen, or a halogen-substituted or unsubstituted C1 to C20 hydrocarbyl, a is an integer of 2 or more, $R^4$ are same as or different from each other, and are each independently halogen, a C1 to C20 hydrocarbon substituted with a C1 to C20 hydrocarbon or halogen, and D is aluminum or boron.

Examples of the compound represented by Chemical Formula 2 include methylaluminoxane, ethylaluminoxane, isobutylaluminoxane, butylaluminoxane and the like, and a more preferred compound is methylaluminoxane.

Examples of the compound represented by Chemical Formula 3 include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron and the like, and a more preferred compound may be selected from trimethylaluminum, triethylaluminum, and triisobutylaluminum.

Meanwhile, the borate-based second catalyst included in the single metallocene catalyst of the present disclosure may be a borate compound represented by the following Chemical Formula 4 or 5.

$$[L-H]^+[Z(A)_4]^- \quad \text{[Chemical Formula 4]}$$

$$[L]^+[Z(A)_4]^- \quad \text{[Chemical Formula 5]}$$

in Chemical Formulae 4 and 5, L is independently a neutral or cationic Lewis acid, H is independently a hydrogen atom, Z is independently boron, A is independently a C6 to C20 aryl or alkyl group, of which one or more hydrogen atoms are substituted with halogen, a C1 to C20 hydrocarbyl, alkoxy, phenoxy, a nitrogen atom, a phosphorus atom, a sulfur atom or an oxygen atom.

The borate-based second catalyst may preferably include trityl tetrakis(pentafluorophenyl) borate, N,N-dimethylanilinium tetrakis(pentafluorophenyl) borate, trimethylammonium tetrakis(pentafluorophenyl) borate, triethylammonium tetrakis(pentafluorophenyl) borate, tripropylammonium tetrakis(pentafluorophenyl) borate. This cocatalyst of the present disclosure exhibits application specificity and preparation method specificity as it is used in the preparation of polyolefins suitable for fiber production.

Meanwhile, the single metallocene catalyst is preferably prepared by supporting the metallocene compound of Chemical Formula 1; and supporting the borate-based second cocatalyst on the support, before or after supporting the first cocatalyst on the support as described above.

In addition, the supporting conditions are not particularly limited and the supporting step may be carried out within a range well known to those skilled in the art. For example, the supporting step may be carried out at high temperature and at low temperature appropriately. Specifically, when the first cocatalyst and the second cocatalyst are supported on the support, a temperature may be about 25 to about 100° C. At this time, the supporting time of the first cocatalyst and the second cocatalyst may be appropriately controlled depending on the amount of the cocatalysts to be supported. Also, a reaction temperature of the metallocene compound with the support may be about −30° C. to about 150° C., preferably at room temperature to about 100° C., more preferably about 30° C. to about 80° C. The reacted supported catalyst may be used without further treatment after the reaction solvent is removed through filtration or distillation under reduced pressure, or subjected to Soxhlet filtering using aromatic hydrocarbon such as toluene, if necessary.

In the polymerization, the supported metallocene catalyst may be used after being diluted in the form of a slurry in a solvent such as a C5 to C12 aliphatic hydrocarbon solvent (e.g., isobutane, pentane, hexane, heptane, nonane, decane and isomers thereof), an aromatic hydrocarbon solvent (e.g., toluene and benzene), and a chlorine-substituted hydrocarbon solvent (e.g., dichloromethane and chlorobenzene). Preferably, the solvent is treated with a small amount of aluminum to remove a small amount of water, air, or the like acting as a catalyst poison.

The polymerization may be carried out by using a reactor selected from the group consisting of a continuous slurry polymerization reactor, a loop slurry reactor, a gas phase reactor, and a solution reactor, alone or in combination of two or more of the same or different reactors to feed olefin-based monomers continuously according to conventional methods.

A polymerization temperature may be about 25 to about 500° C., preferably about 25 to about 200° C., and more preferably about 50 to about 150° C. Further, a polymerization pressure may be about 1 to about 100 Kgf/cm², preferably about 1 to about 70 Kgf/cm², and more preferably about 5 to about 50 Kgf/cm².

Advantageous Effects

As described above, the ethylene/alpha-olefin copolymer according to the present disclosure is excellent in both mechanical properties and processibility.

DETAILED DESCRIPTION OF THE EMBODIMENTS

Figure 1:
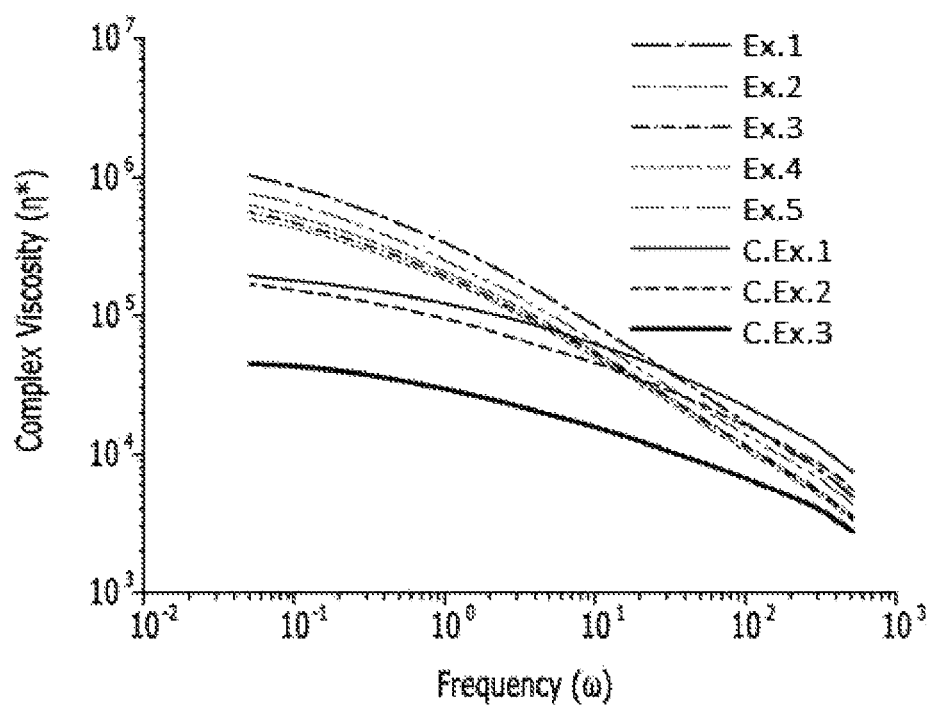
FIG. 1 shows a graph of complex viscosity versus frequency of the copolymer prepared in Examples and Comparative Examples.

The present invention will be described in more detail with reference to the following Examples. However, the following Examples are for illustrative purposes only, and the present invention is not intended to be limited by the following Examples.

Preparation Example

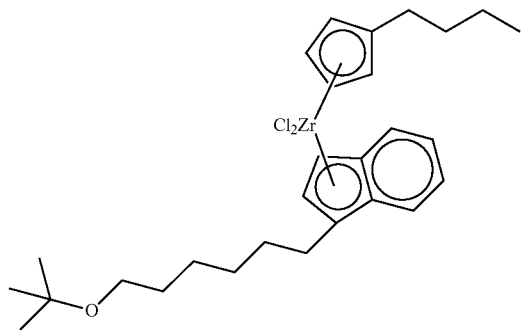

11.6 mL (100 mmol) of indene was added to a well-dried 250 mL schlenk flask, diluted with 80 mL of THF and stirred. 48 mL of 2.5M nBuLi hexane solution was slowly added thereto, and after 3 hours, 18.3 g (95 mmol) of 6-chloro hexyl tert-butyl ether was added and reacted for 12 hours. As the reaction proceeded, the reaction mixture turned into a bright pink suspension. After the reaction was completed, 100 mL of water was added to the mixture and extracted more than three times with 100 mL of ether. The obtained organic layer was dried with MgSO₄, and the solvent was removed by filtration and reduced pressure.

Thereafter, vacuum distillation at 100° C. and 20 mmHg was carried out to obtain a pure tether-indene ligand with a yield of 90%.

$^1$H NMR (500 MHz, CDCl$_3$): 1.22 (9H, s), 1.62 (2H, m), 1.77 (2H, m), 2.58 (2H, m), 3.36 (2H, s), 3.42 (2H, m), 6.28 (1H, s), 7.19 (1H, m), 7.24 (1H, m), 7.40 (1H, m), 7.48 (1H, m)

10 mmol of the ligand obtained above was dissolved in 45 mL of ether, and then 5 mL (1.25 eq.) of nBuLi hexane solution was added thereto. After 6 hours, 20 g (0.95 eq.) of nBuCpZrCl$_3$ toluene solution (0.273 g/mmol) was slowly added thereto at −78° C., and then the mixture was heated and further stirred for one day. The reaction mixture was passed through a filter, and the filtrate was concentrated, extracted with 100 mL of hexane and then concentrated again to obtain 90% or more of the desired compound.

$^1$H NMR (500 MHz, CDCl$_3$): 0.93 (3H, t), 1.15 (9H, s), 1.24~1.55 (10H, m), 1.58~1.64 (2H, m), 3.34 (2H, m), 5.77 (0.5H, s), 5.82 (1H, m), 6.02 (0.5H, s), 6.40 (1H, s), 6.62 (1H, s), 7.26 (2H, m), 7.42 (2H, m)

Example 1

Step 1) Preparation of a Supported Catalyst 49.7 mL of a 10 wt % methylaluminoxane (MAO)/toluene solution was added to a glass reactor, and 9.1 g of silica (Grace 952, particle size: 30 μm, surface area: 300 m$^2$/g, pore volume: 1.6 mL/g, pore diameter: 20 nm) was added thereto at 40° C. Thereafter, the mixture was stirred at 200 rpm for 16 hours while raising the temperature of the reactor to 60° C. And then, the temperature was lowered again to 40° C. Thereafter, 441 mg of the metallocene compound of Synthesis Example 1 was added thereto in a solution state after being dissolved in toluene, and the mixture was stirred for 2 hours. Subsequently, 730 mg of N,N-dimethylanilinium tetrakis(pentafluorophenyl)borate was added thereto in a solution state after being dissolved in 20 mL of toluene, and the mixture was stirred at 40° C. for 2 hours. After completion of the reaction, the stirring was stopped, and the toluene layer was separated and removed. Thereafter, the remaining toluene was removed at 40° C. under reduced pressure to prepare a supported single metallocene catalyst.

Step 2) Preparation of a Ethylene/1-Butene Copolymer

Polymerization was carried out using the above-prepared supported catalyst and a hexane slurry stirred tank process polymerization reactor. Polymerization conditions were 10 kg/hr of ethylene, 7 kg/cm$^2$ of pressure, 82° C. of temperature, 3 g/hr of hydrogen, and 7 cc/min of 1-butene.

Example 2

An ethylene/1-butene copolymer was prepared in the same manner as in Example 1 except that the polymerization condition was changed to 3.5 g/hr of hydrogen in the step 2 of Example 1.

Example 3

An ethylene/1-butene copolymer was prepared in the same manner as in Example 1 except that the polymerization condition was changed to 3.6 g/hr of hydrogen in the step 2 of Example 1.

Example 4

An ethylene/1-butene copolymer was prepared in the same manner as in Example 1 except that the polymerization condition was changed to 3.7 g/hr of hydrogen in the step 2 of Example 1.

Example 5

An ethylene/1-butene copolymer was prepared in the same manner as in Example 1 except that the polymerization condition was changed to 3.3 g/hr of hydrogen in the step 2 of Example 1.

Comparative Examples 1 to 3

As Comparative Examples, the following were used.
Comparative Example 1: CAP602 (manufactured by INEOS)
Comparative Example 2: Lutene® H ME1000 (manufactured by LG Chem)
Comparative Example 3: Lumicene® M5220 (manufactured by Total)

Experimental Examples

Properties of the copolymers of Examples and Comparative Examples were evaluated by the following methods.

1) Density: ASTM D1505

2) Melt flow rate (MFR, 5 kg/2.16 kg): measured at 190° C., ASTM 1238

3) MFRR (MFR$_5$/MFR$_{2.16}$): a ratio where MFR$_5$ melt index (MI, 5 kg of load) is divided by MFR$_{2.16}$ (MI, 2.16 kg of load).

4) Mn, Mw, MWD: The sample was pretreated by dissolving in 1,2,4-trichlorobenzene containing 0.0125% of BHT at 160° C. for 10 hours using PL-SP260. The number average molecular weight (Mn) and the weight average molecular weight (Mw) were measured at 160° C. using PL-GPC220. MWD is represented by a ratio (Mw/Mn) between the weight average molecular weight and the number average molecular weight.

5) Graph of complex viscosity versus frequency: Complex viscosity was measured with ARES (Advanced Rheometric Expansion System) of TA instruments. Samples were made using a parallel plate with a diameter of 25.0 mm at 190° C. so as to have a gap of 2.0 mm. Measurement was carried out in a dynamic strain frequency sweep mode with a strain of 5%, a frequency of 0.05 rad/s to 500 rad/s, and a total of 41 points with 10 points at each decade. Power law fitting was carried out using TA Orchestrator which is a measurement program. This graph is shown in FIG. 1.

Figure 2:
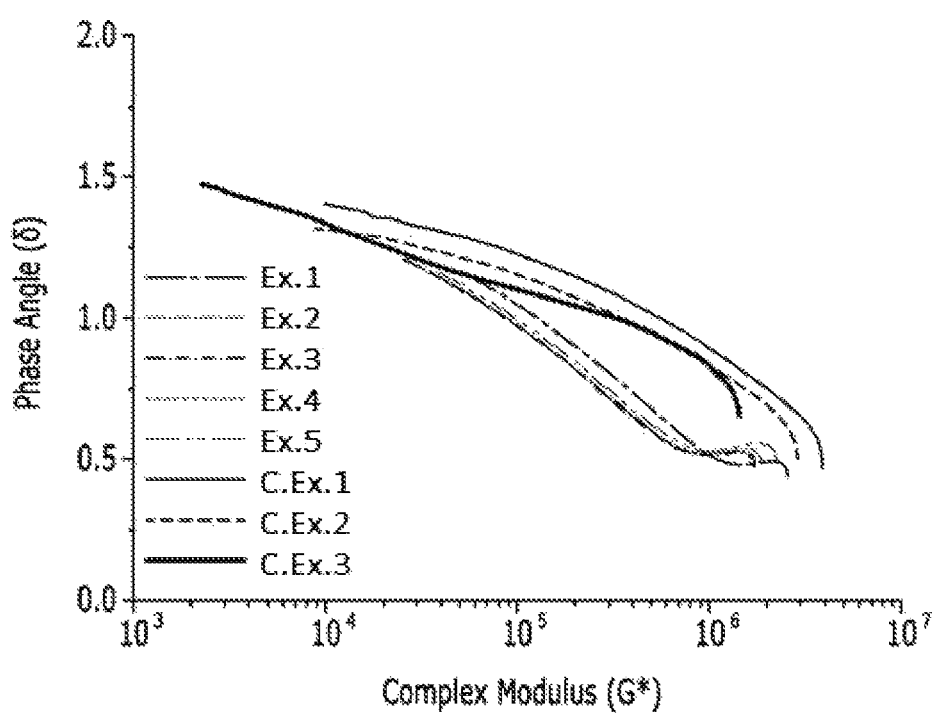
FIG. 2 shows a vGP plot of the copolymer prepared in Examples and Comparative Examples.

6) Plateau Delta: The Van Gurp-Palmen plot was obtained by plotting G* and delta among variables derived from dynamic frequency sweep test. This graph is shown in FIG. 2.

7) Spiral flow length: ENGEL 150 ton injection machine was used. The mold thickness was 1.5 mm, the injection temperature was 190° C., the mold temperature was 50° C., and the injection pressure was 90 bar.

The results are listed in Table 1 below.

TABLE 1

| | Density | $MFR_{2.16}$ | MFRR ($MFR_5/MFR_{2.16}$) | Mw | MWD | Plateau Delta | $-S\eta^*$ ($-C_2$) | Spiral Flow |
|---|---|---|---|---|---|---|---|---|
| Unit | g/cm³ | g/10 min | — | g/mol | — | rad | — | cm |
| Ex. 1 | 0.952 | 0.22 | 6.7 | 200k | 10.6 | 0.48 | 0.61 | 14.5 |
| Ex. 2 | 0.952 | 0.45 | 7.2 | 170k | 12.3 | 0.52 | 0.57 | 16.0 |
| Ex. 3 | 0.953 | 0.52 | 6.9 | 168k | 12.2 | 0.52 | 0.58 | 16.2 |
| Ex. 4 | 0.953 | 0.56 | 6.9 | 165k | 12.6 | 0.52 | 0.57 | 16.5 |
| Ex. 5 | 0.951 | 0.33 | 6.6 | 180k | 9.8 | 0.53 | 0.59 | 15.8 |
| Comp. Ex. 1 | 0.952 | 0.78 | 3.4 | 140k | 9.8 | — | 0.35 | 10.1 |
| Comp. Ex. 2 | 0.953 | 0.84 | 3.9 | 155k | 13.4 | — | 0.37 | 12.0 |
| Comp. Ex. 3 | 0.952 | 2.00 | 3.5 | 85k | 4.3 | — | 0.3 | 13.0 |

The invention claimed is:

1. An ethylene/alpha-olefin copolymer having:
a weight average molecular weight of 180,000 to 250,000 g/mol,
a molecular weight distribution (Mw/Mn) of 5 to 20,
a density of 0.950 to 0.965 g/cm³,
a melt flow rate ratio $MFR_5/MFR_{2.16}$, measured at 190° C. according to ASTM 1238 of 5 to 10, and
a spiral flow length of 15 to 25 cm, wherein the spiral flow length is evaluated by using a mold having a thickness of 1.5 mm, an injection temperature of 190° C., a mold temperature of 50° C., and an injection pressure of 90 bar,
wherein the ethylene/alpha-olefin copolymer is prepared by polymerizing ethylene and alpha-olefin in the presence of a supported single metallocene catalyst including a metallocene compound of the following Chemical Formula 1; an aluminum-containing first cocatalyst; a borate-based second cocatalyst; and a support:

$(Cp^1R^1)_n(Cp^2R^2)MX_{3-n}$  [Chemical Formula 1]

in Chemical Formula 1,
M is a Group 4 transition metal;
$Cp^1$ and $Cp^2$ are same as or different from each other, and are each independently any one selected from the group consisting of cyclopentadienyl, indenyl, 4,5,6,7-tetrahydro-1-indenyl, and fluorenyl radical, provided that both $Cp^1$ and $Cp^2$ are not cyclopentadienyl, and they are optionally substituted with a C1 to C20 hydrocarbon;
$R^1$ and $R^2$ are same as or different from each other, and are each independently hydrogen, a C1 to C20 alkyl, a C1 to C10 alkoxy, a C2 to C20 alkoxyalkyl, a C6 to C20 aryl, a C6 to C10 aryloxy, a C2 to C20 alkenyl, a C7 to C40 alkylaryl, a C7 to C40 arylalkyl, a C8 to C40 arylalkenyl, or a C2 to C10 alkynyl;
X is a halogen atom, a C1 to C20 alkyl, a C2 to C10 alkenyl, a C7 to C40 alkylaryl, a C7 to C40 arylalkyl, a C6 to C20 aryl, a substituted or unsubstituted C1 to C20 alkylidene, a substituted or unsubstituted amino, a C2 to C20 alkylalkoxy, or a C7 to C40 arylalkoxy; and
n is 1 or 0.

2. The ethylene/alpha-olefin copolymer of claim 1, wherein the weight average molecular weight is 180,000 to 220,000 g/mol.

3. The ethylene/alpha-olefin copolymer of claim 1, wherein the molecular weight distribution (Mw/Mn) is 10 to 15.

4. The ethylene/alpha-olefin copolymer of claim 1, wherein the melt flow rate ratio is 5 to 8.

5. The ethylene/alpha-olefin copolymer of claim 1, wherein a $C_2$ value of Equation 1 is −1.0 to −0.4, when a graph of complex viscosity ($\eta^*[Pa\cdot s]$) versus frequency ($\omega[rad/s]$) of the ethylene/alpha-olefin copolymer is fitted to Power Law of the following Equation 1:

$y = c_1 x^{c_2}$  [Equation 1]

wherein x means frequency, y means complex viscosity, and c1 refers to a consistency index.

6. The ethylene/alpha-olefin copolymer of claim 1, wherein a plateau delta value in a Van Gurp Palmen plot of the ethylene/alpha-olefin copolymer is 0.1 to 1.0 rad,
wherein in the Van Gurp-Palmen plot, the x-axis represents complex modulus (G, dyne/cm²) and the y-axis represents phase angle (d(delta)).

7. The ethylene/alpha-olefin copolymer of claim 1, wherein the alpha-olefin is at least one selected from the group consisting of 1-propylene, 1-butene, 1-pentene, 1-hexene, 4-methyl-1-pentene, 1-octene, 1-decene, 1-dodecene, 1-tetradecene, 1-hexadecene, 1-octadecene, and 1-eicosene.

* * * * *